United States Patent
Kiraly et al.

(10) Patent No.: US 8,260,793 B2
(45) Date of Patent: Sep. 4, 2012

(54) METHOD AND SYSTEM FOR DATA CLASS UPDATE

(75) Inventors: David A. Kiraly, Fort Wayne, IN (US); Adam L. Adkins, Fort Wayne, IN (US); Gregory M. Jewell, Fort Wayne, IN (US)

(73) Assignee: Raytheon Company, Waltham, MA (US)

( * ) Notice: Subject to any disclaimer, the term of this patent is extended or adjusted under 35 U.S.C. 154(b) by 271 days.

(21) Appl. No.: 12/813,700

(22) Filed: Jun. 11, 2010

(65) Prior Publication Data

US 2011/0035405 A1 Feb. 10, 2011

Related U.S. Application Data

(60) Provisional application No. 61/221,171, filed on Jun. 29, 2009.

(51) Int. Cl.
*G06F 17/30* (2006.01)

(52) U.S. Cl. ........ 707/756; 707/791; 707/793; 707/802; 707/803; 707/804; 707/805; 717/158; 717/172; 714/54; 714/38.12; 714/38.14; 711/130; 718/100

(58) Field of Classification Search .................. 707/756, 707/791, 793, 802–805; 717/158, 172; 714/54, 714/38, 38.14; 711/130; 718/100
See application file for complete search history.

(56) References Cited

U.S. PATENT DOCUMENTS

| | | | |
|---|---|---|---|
| 6,230,243 B1 * | 5/2001 | Elko et al. ................ 711/130 |
| 6,415,315 B1 | 7/2002 | Glass | |
| 6,728,738 B2 * | 4/2004 | Wolczko et al. ................ 1/1 |
| 7,197,489 B1 * | 3/2007 | Gauvin et al. ................ 1/1 |
| 7,207,002 B2 | 4/2007 | Mireku | |
| 7,302,612 B2 * | 11/2007 | Nye et al. ................ 714/38.14 |
| 7,305,672 B2 * | 12/2007 | Vincent ................ 717/172 |
| 7,577,907 B2 | 8/2009 | Vishnia-Shabtai et al. | |
| 7,890,809 B2 * | 2/2011 | Nye et al. ................ 705/7.11 |
| 8,001,539 B2 * | 8/2011 | Mitchell ................ 717/158 |
| 2004/0044637 A1 | 3/2004 | Vachuska et al. | |
| 2004/0221202 A1 * | 11/2004 | Nye et al. ................ 714/38 |
| 2005/0149922 A1 * | 7/2005 | Vincent ................ 717/172 |
| 2008/0208888 A1 * | 8/2008 | Mitchell ................ 707/102 |
| 2009/0019104 A1 | 1/2009 | Justen et al. | |
| 2009/0193012 A1 * | 7/2009 | Williams ................ 707/5 |
| 2009/0193418 A1 * | 7/2009 | Nye et al. ................ 718/100 |
| 2011/0307745 A1 * | 12/2011 | McCune et al. ................ 714/54 |

* cited by examiner

*Primary Examiner* — Frantz Coby

(74) *Attorney, Agent, or Firm* — Daly, Crowley, Mofford & Durkee, LLP

(57) ABSTRACT

A method for updating data includes, in a processor, receiving a data field update associated with an existing data object of a data class, modifying a data field of an updater data object of the data class based upon the data field update, traversing the updater data object to identify the modified data field, and modifying a data field of the existing data object based upon the identified data field of the updater data object.

36 Claims, 7 Drawing Sheets

400

1. Parse the data field update to obtain the data field update value and the existing object key.

2. Return the object data type of the existing object using the object key.

3. Define a new class object called *updater* of the returned object data type.
   3A. Initialize all the data fields of *updater* to null.
   3B. Modify the data field associated with the data field update (i.e., the LAUNCHED data field).

4. Get the existing object called *existing* from memory using the object key.

5. Call the Java Bean reflection update method, passing *updater* and *existing* objects.
   5A. Traverse each data class in the *updater* object.
   5B. For the next data field in the *updater* object, use getter method to get the data field value.
   5C. If the data field value is not NULL, then use the setter method to set the data field in *existing* object.

6. Continue with next data field update or terminate.

*FIG. 4*

METHOD AND SYSTEM FOR DATA CLASS UPDATE

RELATED APPLICATIONS

This application claims the benefit of U.S. Provisional Application No. 61/221,171 filed Jun. 29, 2009 under U.S.C. §119(e) which application is hereby incorporated by reference in its entirety.

STATEMENT REGARDING FEDERALLY SPONSORED RESEARCH

This invention was made with Government support under DAAB07-99-C-E003 awarded by the United States Army. The Government may have certain rights in this invention.

FIELD OF THE INVENTION

The inventive techniques and concepts described herein are directed to updating data and, in particular, to updating data in an existing data object by traversing a data object class hierarchy to identify modified data.

BACKGROUND

As is known in the art, object-oriented programming (OOP) is a programming paradigm that encapsulates data behavior into self-sufficient reusable objects which include data and operations on the data. In particular, in OOP programmers use data classes to define abstract characteristics of a domain object. For example, programmers may represent a vehicle using a data class that includes vehicle attributes, such as a number of wheels, an exterior color, a velocity, etc., as well as vehicle operations such as moving and stopping.

OOP includes features that may be particularly attractive to programmers. For example, OOP data inheritance allows programmers to design data class hierarchies for a particular domain. The data class hierarchies may include classes that inherit particular characteristics of a parent class, as well as override certain generic behaviors for specific behaviors germane to a subclass.

As an example, a programmer can create a data class hierarchy to represent dogs and individual breeds of dogs. The dog data class hierarchy can define a parent or base class to include attributes and behaviors shared by all dog breeds. For example, the dog class may include a breed of dog, a dog name, and an ability to bark. Programmers may then define subclasses of the dog class to further differentiate breeds from each other. For example, a subclass may be defined for Golden Retriever, Chihuahua, Beagle, etc., that includes specific behaviors, such as whether the breed has a coat of fur or hair.

In OOP, the attributes and behaviors of the base class are conveniently propagated to the subclasses, which can reduce program time and cost as well as simplify domain design. Polymorphism may be used to override common behaviors. For example, most animals can make a noise. In a base animal data class, an operation called "make_noise( )" may be used to perform this common behavior. A pig subclass may override the make_noise( ) operation to elicit an "oink( )" operation.

An instance of a data class includes an actual data class object created at runtime that includes the actual values of the data class object, such as an exterior color of an automobile, a velocity of the automobile, etc. The data class operations, so-called methods, may be used to retrieve and/or modify the data class attributes. For example, a get and a set method may be used to respectively retrieve the exterior color and to set the exterior color of an instance of a vehicle data class.

As is also known in the art, a JavaBean is a reusable software component written in the Java® programming language and with OOP techniques in mind (Java is a registered trademark of Sun Microsystems, Inc. of Santa Clara, Calif.). A JavaBean encapsulates many data class objects into a single object (a so-called "bean") that can conveniently be packaged and transferred from platform to platform. The following code segment is an example of a JavaBean called "DogBean.java":

```
public class DogBean implements java.io.Serializable {
    private String breed;//a data field of the DogBean
    public DogBean( ){ } //constructor to create and
        return a new DogBean
object
    public String getBreed( ){ return this.breed;}//
        get breed data field
    public void setBreed(final String breed){ this.breed =
        breed;}//set breed
    data field
    }
```

As can be seen, the JavaBean is serializable so that a state of the DogBean may be saved and recalled, and includes a constructor to define an instance of the DogBean, and get and set operations for every defined data field, here, a string called "breed."

JavaBean conventions require that every bean class define getter and setter methods (i.e., a get( ) and a set( ) method) to respectively get and set data fields of the bean. The following code segment may be used to test the DogBean and execute the get and set methods:

```
public class TestDogBean {
    public static void main(String{ } args) {
        DogBean dog = new DogBean( );// create a
        DogBean instance
        dog.setBreed("Black Labrador");//set
        the breed data field
        // Output the breed
        System.out.print(dog.getBreed( ));//output using
        getter method
    }
}
```

In the conventional art, programmers write code to update JavaBean objects and, in particular, data fields of a JavaBean object. Programmers must write separate lines of code to individually address whether each data field is to be modified and, if so, modify the data field. As an example, a JavaBean object may include three data fields as follows:

```
JavaBean Object OldObject {
    Data A = X;
    Data B = Y;
    Data C = Z;
}
```

Here, Data A, Data B, and Data C refer to there data fields of Object OldObject having respective values of X, Y, and Z. A JavaBean update object UpdateObject may include an update to one of the data fields as follows:

```
JavaBean Object UpdateObject {
    Data A = null;
    Data B = YY:
    Data C = null;
}
```

Here, data fields Data A and Data C are equal to "null," indicating no update to these fields, whereas data field Data B is to be updated to "YY." An update method to perform the update to Object OldObject includes the following code segment:

If(UpdateObject.getDataA( )!=null){
OldObject.setDataA(UpdateObject.getDataA( ));}
If(UpdateObject.getDataB( )!=null){
OldObject.setDataB(UpdateObject.getDataB( ));}
If(UpdateObject.getDataC( )!=null){
OldObject.setDataA(UpdateObject.getDataC( ));}

As can be seen, a separate "if" statement is required for each data field. Although the above example is relatively simple, a real-world scenario involving complex, many-tiered object hierarchies and thousands of data classes and their respective data fields may require a programmer to write and test (and modify) tens-of-thousands of lines of code in order to successfully implement a JavaBean. This can significantly increase development time, effort, and cost, as well as significantly increase product support and maintenance requirements. Furthermore, as the code base increases in size, so does the opportunity for code defects due to programmer error.

SUMMARY

In general overview, the inventive concepts, techniques, and systems described herein enable data class updates to data class object fields without the need to write, test, and/or modify separate code segments to update each of the data fields. In one embodiment, modules saved in a storage medium and executed on a processor are used to update an existing Java Bean object with a Java Bean object that includes a data field update. The modules use Java Bean reflection to traverse a data class hierarchy of an object instance and to call get and set methods to perform the data field update.

One of ordinary skill in the art will appreciate that the inventive concepts, techniques, and systems are not limited to Java Bean object update in the Java programming environment. For example, the inventive concepts and systems may be applied to data class object update in most any object-oriented pre-compiled and/or runtime environment including, but not limited to, Action Script for ADOBE® FLEX® manufactured by Adobe Systems, Inc. of San Jose, Calif., Perl, Ruby, Lua, C#, Object C, JavaScript, etc.

Organizations may use the inventive concepts, techniques, and systems to perform class object updates (e.g. Java Bean updates) over a network. In particular, in order to save network resources and/or in bandwidth constrained environments, the information related to a Java Bean update, for example, may be minimized to an update value for a data field and/or a data object class identifier to identify the existing Java Bean object associated with the update. Use of the inventive concepts, techniques, and systems eliminates the need to develop, test, and modify "if" extensive blocks of code to handle the data updates. Furthermore, because the inventive concepts, techniques, and systems leverage getter and setter methods for data fields, changes to the data structures do not require changes to the update code. All that is needed is to write the get and set method for each of the data fields once and to identify the data update value, and the update code need not change.

By eliminating the need to write cumbersome "if" blocks, the inventive concepts and systems may significantly reduce the number of lines of code required to implement interfaces such as Java Bean interfaces and updates to objects such as Java Bean objects. Fewer lines of code also reduce the opportunity for programmer (and/or tester) error and code defects, as well as potential support and maintenance issues down the road.

In one particular embodiment, a Java Bean object update may be performed by an update method call, which may include passing an existing Java Bean object and an updated Java Bean object and traversing a data class hierarchy, which may include traversing all of the data fields. The update method call may use predefined data field getter and setter methods to determine whether a data field has been modified and, if so, perform a data field update to an existing object.

The inventive concepts, techniques, and systems can leverage data marshalling performed for only an updated portion of an object. This can reduce an amount of data that needs to be transferred over a network, thereby reducing network load and data transfer time.

In one aspect, a method for updating data includes in a processor, receiving a data field update associated with an existing data object of a data class, modifying a data field of an updater data object of the data class based upon the data field update, traversing the updater data object to identify the modified data field, and modifying a data field of the existing data object received from a memory based upon the identified data field of the updater data object.

In another aspect, a system for updating data includes a data class updater for receiving a data field update associated with an existing data object of a data class which includes a first data modifier to modify a data field of an updater data object of the data class based upon the data field update, and a second data modifier to traverse the updater data object, identify the modified data field, and modify a data field of the existing data object based upon the identified data field.

BRIEF DESCRIPTION OF THE DRAWINGS

The foregoing features of this the inventive systems and methods may be more fully understood from the following description of the drawings in which:

FIG. 4 is a pseudo code listing of an embodiment of a process in performance of the inventive concepts and systems described herein;

DETAILED DESCRIPTION

Figure 1:
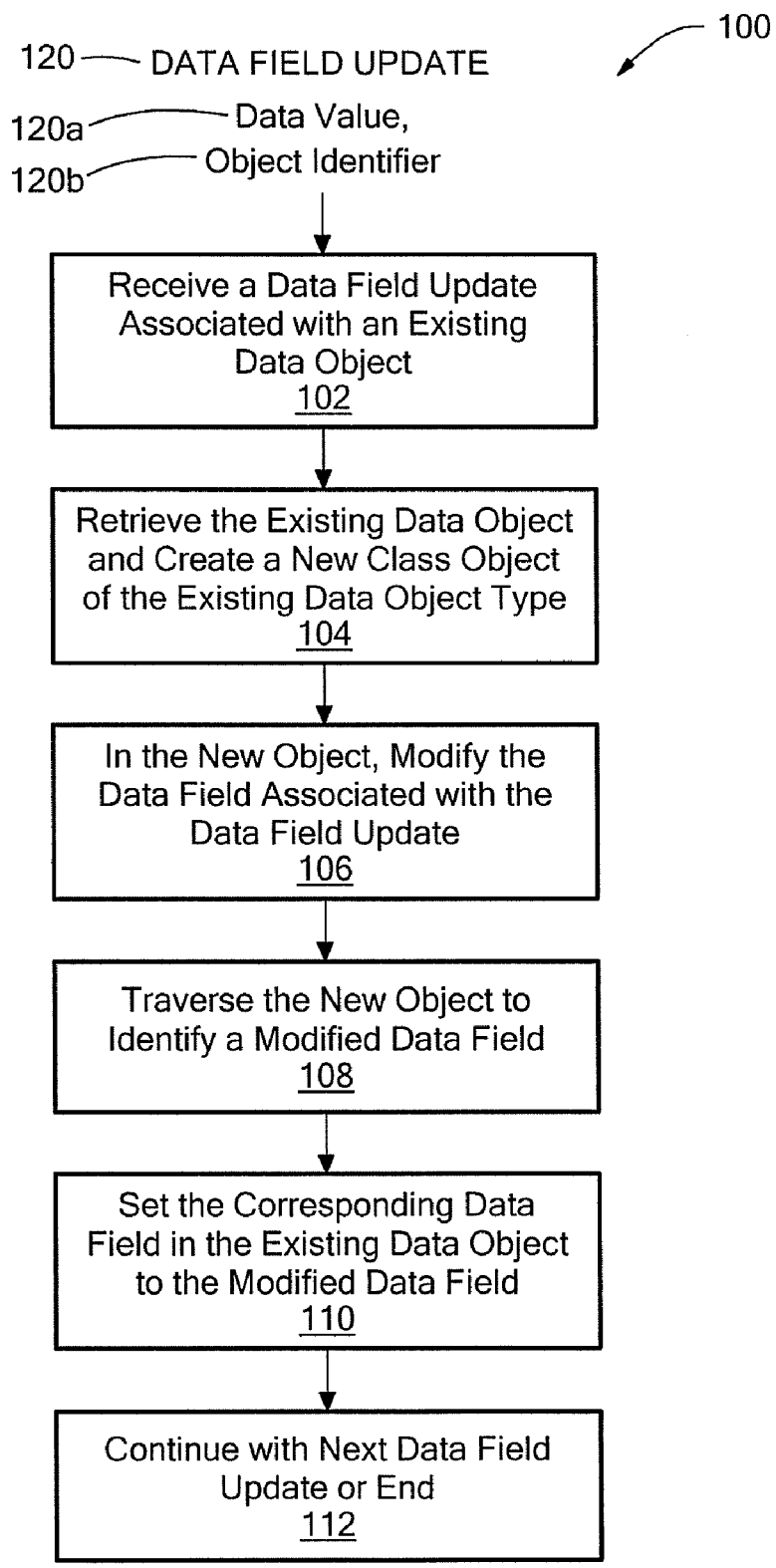
FIG. 1 is a flow diagram of an embodiment of a method for updating an object.

Referring now to FIG. 1, in one embodiment of the inventive concepts described herein, a method 100, (typically executed in a processor) begins as shown in block 102 by receiving a data field update (such as data field update 120) associated with an existing data object of a data class The method continues by retrieving the existing data object from a memory and creating a new class object of the existing data class object type as indicated by reference numeral 104, and, in the new class object, modifying a data field associated with the data field update 120 as indicated by reference numeral 106. The method 100 further includes traversing the new class object to identify the modified data field as indicated by reference numeral 108, and setting the corresponding data field in the existing class object to the modified data field of the new class object as indicated by reference numeral 110. In a further embodiment and as indicated by reference numeral 112, the method 100 includes reiterating 102-110 to perform one or more additional data field updates.

As will be described in further detail below, in one embodiment, the method 100 may be implemented using one or more software modules written in program code, compiled, and loaded into a memory for execution by a processor.

In a further embodiment, the data field update 120 includes a data field value 120a to update a data field of an existing data object. For example, the data field value 120a may include, but is not limited to, a number, one or more characters of a text string, etc. In still a further embodiment, the data field update 120 includes a dummy update object of the same data class object type as the existing data object. The dummy update object includes a modified data field associated with the data field value 120a. The dummy update object may also include an object identifier 120b to identify the existing data object associated with the data field update 120.

In one embodiment, a processor receives a dummy update object from an external system to update the existing data object. In a further embodiment, the processor receives the dummy update object encoded in an eXtensible Markup Language (XML) format suitable for transmission, for example, over a network. Alternatively, the processor receives the dummy update object as a marshalled data object.

In a further embodiment, the external system may be preconfigured to transmit the data field update 120 in a preconfigured format for processing (i.e. as an XML file or as marshalled data object including data tags, data values, and/or serialized data). As will be described further below, the processor receives the data field update 120, creates a new class object, modifies the data field of the new class object associated with the data field update 120, and traverses the new class object to modify the corresponding data field in the existing data class object.

In another embodiment, the processor includes a first processor to create and modify the new class object, and a second processor to traverse the new class object and modify the existing data class object. In still another embodiment, the first processor is a processor of a server machine, and the second processor is a processor of a client machine. In yet another embodiment, the first processor marshals the new class object for transmission to the second processor which executes a thin client to unmarshal and traverse the new class object, and modify the corresponding data field of the existing class object. Alternatively, the server converts the new class object to XML data, which is received and decoded on the client.

Figure 2:
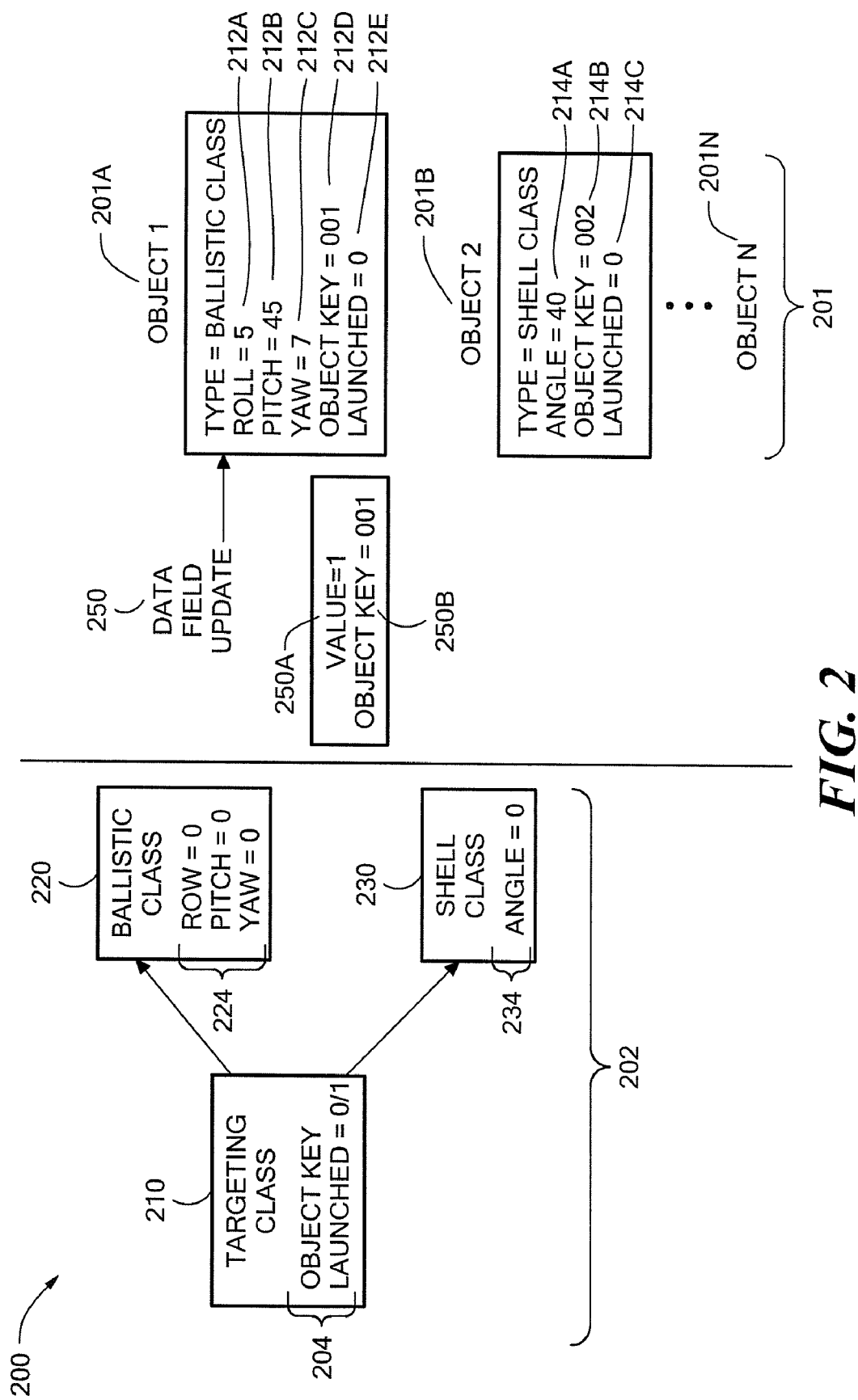
FIG. 2 is a block diagram of a data class hierarchy and data class instances of the type which may be used in performance of the method of FIG. 1.

Referring now to FIG. 2, a data class hierarchy 200 of the type which may be used in operation of the inventive concepts and systems described herein to update data in the data class hierarchy 200 includes one or more data classes (generally denoted by reference numeral 202). As an example, the data class hierarchy 200 may define targeting objects such as a missile targeting object for use during military targeting operations. It will be understood, however, that the inventive concepts and systems disclosed herein may be used in non-military domain spaces, such as in commercial applications.

The data class hierarchy 200 may include a targeting base class 210, a ballistic subclass 220 of the targeting base class 210 and a shell subclass 230 of the targeting base class 210. Although not shown, the data class hierarchy 200 may include other types of classes, such as classes for more specific types of ballistics (i.e., missiles) and/or more specific types of shells (i.e. bombs). Each of the data classes 210, 220, 230 includes respective methods (not shown) for defining class object behaviors. For example, the ballistic class 220 includes a get and a set method for each of its data fields 224 and, in addition, may include an activate method to activate (i.e. launch) the target object.

Existing data class objects (generally denoted by reference numeral 201) are instances of the data class objects 202. For example, existing data class object 201A, hereinafter "OBJECT 1," is an instance of the ballistic data class 220 and includes data fields 204 inherited from a base class 210 and data fields 224 defined in the subclass 220. In particular, OBJECT 1 includes a ROLL data field 212A equal to 5 degrees, a PITCH data field 212B equal to 45 degrees, and a YAW data field 212C equal to 7 degrees. OBJECT 1 also includes an OBJECT KEY 212D (also referred to as data key object 212D) equal to "001" and a LAUNCHED data field 212E equal 0.

In one embodiment, the OBJECT KEY 212D is a unique number generated by a random number generator (seeded, for example, by current time-date) or by a primary key field of a database table in a relational database. In one or the same embodiment, the LAUNCHED data field 212E is a Boolean value equal to 0 or 1, referring to whether the targeting object is launched 1 or not launched 0.

Existing data class object 201B, hereinafter "OBJECT 2," is an instance of the shell class 230 and includes an ANGLE data field 214A equal to 40 degrees, an OBJECT KEY data field 214B equal to "002", and a LAUNCHED data field 214C equal to 0. Note that OBJECT 1 and OBJECT 2 both include data fields 204 inherited from base target class 210.

In a further embodiment, a data field update 250 includes a data field value 250A and an existing object identifier 250B. For example, the data field value 250A represents an update to a data field of OBJECT 1. Here, the data field value 250A represents an update to the LAUNCHED data field 212E of OBJECT 1. The existing object identifier 250B is used to indicate which of the existing data objects 201 is associated with the data field update 250. Here, the identifier 250B is "001," which is the OBJECT KEY 212D of OBJECT 1. In a further embodiment, no object exists with a key equal to the identifier 212D. In such a case, a new object may be created and initialized using the data field update 250. For example, the new data object key may be set to 001 and the LAUNCHED data field to 1.

Figure 3:
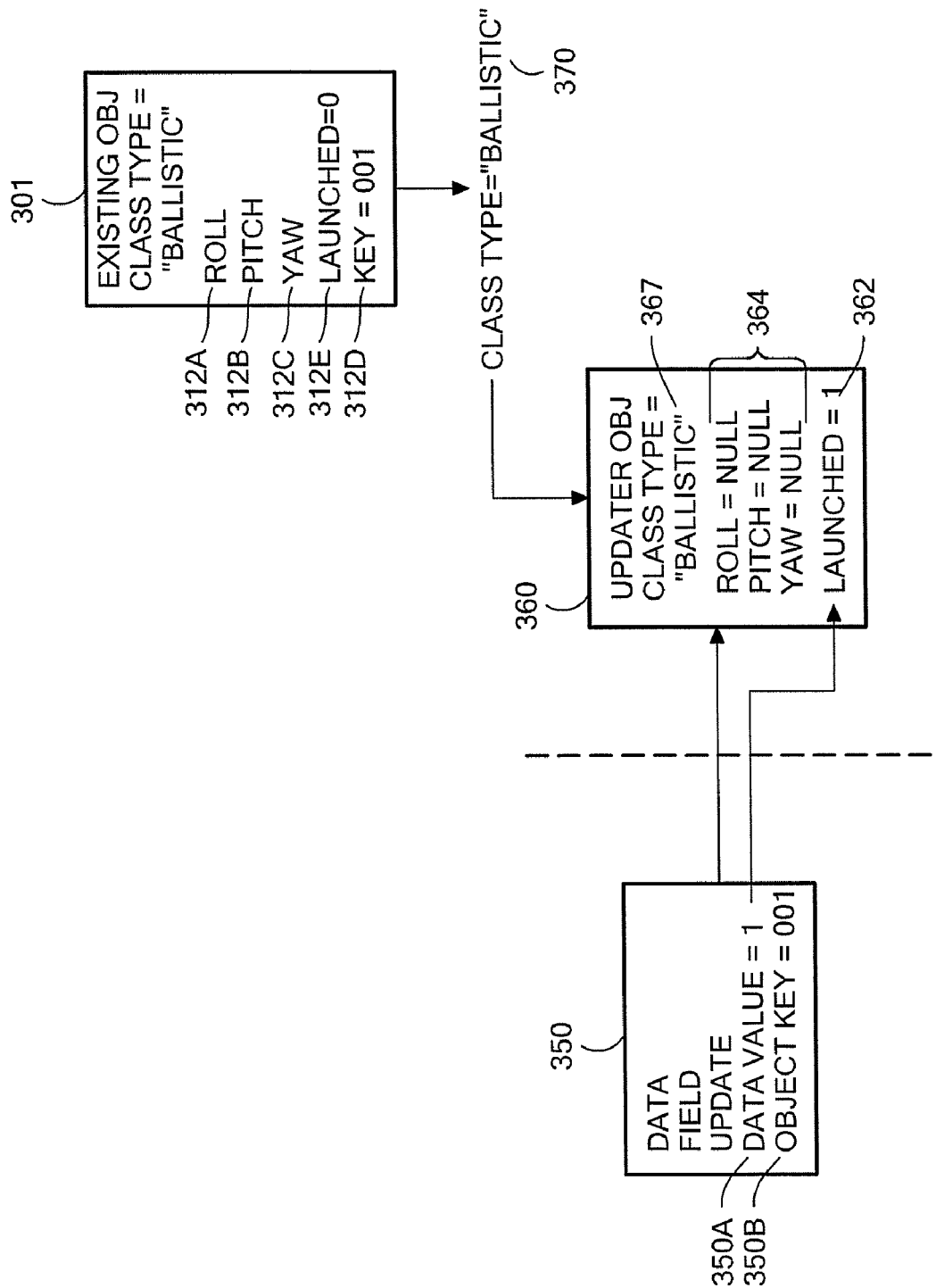
FIG. 3 is a block diagram which illustrates a data class object used to update an existing data class object associated with a data field update.

Referring now to FIG. 3, in a further embodiment of the inventive concepts and systems, a new instance of a data class object 360, hereinafter the "updater data object," is used to update an existing data class object 301 associated with a data field update 350. The updater class object 360 is of the same data class type 370 as the existing data class object 301.

In the embodiment of FIG. 3, the data field update 350 is intended to modify a LAUNCHED data field 312E of the existing data class object 301. The existing data class object 301 (and the updater data object 360) may be used to represent and update targeting objects in a targeting command and tracking application to support military operations. For example, the existing data class object 301 may represent a missile ready for launch and the updater data object 360 may represent a modification to the missile status (e.g., that the missile has been launched) to update the existing data class object 301.

As described above, the updater data object 360 is used to update the existing data object 301 in response to a data field update 350. For example, the data field update 350 includes a data value 350A equal to 1, indicating that a targeting object referenced by an object key 350B has been launched. In FIG. 3, the updater data object 360 is shown after the LAUNCHED data field 362 has been modified to the update value (i.e. set to the data value 350A equal to 1). In a further embodiment, the remaining data fields 364 of the updater data object 360 are set to the null value. One of ordinary skill in the art will recognize that the remaining data fields 364 may be set to other values including, but not limited to, a predefined constant.

The updater data object 360 is traversed to identify the modified data field 362. In one embodiment in which the data class is a Java Bean, Java Bean reflection is used to traverse an entire data class hierarchy of an updater data object 360 to identify a modified data field value 362.

In still a further embodiment, a data class hierarchy is searched until it finds a non-null value for a data field. In the example above, wherein the LAUNCHED data field 362 is modified to a value of 1, and the remaining data fields 364 are set to null, the data class hierarchy will be traversed until the LAUNCHED data field 362 is identified (i.e. until the non-null value of the LAUNCHED data field 362 is identified). A getter method is called on the updater data object 360 to return the value of the LAUNCHED data field 362. This returned value is used to modify a corresponding data field 312E of the existing data object 301. In particular, the setter method is called on the existing data object 301 to set the LAUNCHED data field value 312E to the update value. Note that the other data fields (i.e. data fields 312A, 312B, and 312C) are not modified. In another embodiment, however, a data field update 350 may include more than single update, for example, updates to the data fields 312A, 312B, and/or 312C.

Referring now to FIG. 4, an embodiment of a process 400 to update a data class according to the inventive concepts and systems described herein is shown with reference to operational pseudo code steps 1-6. The process 400 may be executed in a processor, as may be similar to the processor described in conjunction with FIG. 1. Furthermore, as is also described in conjunction with FIG. 1, in a further embodiment, the processor may include a first processor and second processor. The first processor may be a processor of a server machine and may execute steps 1-3, and the second processor may be a processor of a client machine and may execute steps 4-5. In such a configuration, the process 400 may further include encoding the modified updater object in an XML file or marshalling the modified updater object in the first server processor and sending the XML file or marshalled object to the second client processor over a network. The process 400 may further include receiving the XML file or marshalled object in the second client processor and parsing the XML file or unmarshalling the object in the second client processor.

Although not shown in FIG. 4, an initialization may include sending formatting information to an external data system to indicate how to properly encode and transmit a data field update, such as one encoded as a data class domain object. For example, the formatting information may include data class structures (i.e. data class fields, interfaces, inheritance trees, etc.) and data field update values. The XML format may be used to encode a data class, a data field update values, and an object identifier of the existing data object associated with a data field update. One of ordinary skill in the art will recognize that other methods may be used to represent the data class including, but not limited to, data marshalling and/or serialization.

The process 400 first begins as indicated by number 1 when a received data field update is processed to obtain a data field update value and/or an object key of an associated existing data object. In one embodiment, the data field update may be an XML file, in which case the contents of the XML file is parsed to obtain the data field update value. In another embodiment, the data field update is a marshalled data object which is unmarshalled to obtain the data field update value. Next, as indicated by number 2, an object data type of the existing data object is obtained using the object key. As indicated by number 3, a new class object is created called "updater." As indicated by number 3A, data fields of the updater object are initialized to null. As indicated by 3B, a data field of the updater object is set to the data field update value.

As indicated by 4, the object key is used to obtain the existing data object (called "existing") from memory. As indicated by 5, Java Bean reflection is used to traverse the updater object and to identify the modified data field. In a further embodiment, the updater object and the existing object are passed to a reflection update method. For example, the update method may include the following method call: JavaBeanReflection.update(updater, existing);

In the update method, the data fields of the updater object are traversed using reflection (5A). For example, a base class may be traversed, then a first subclass of the base class may be traversed, then a second subclass of the first subclass may be traversed and so on, until all the data fields have been traversed.

As indicated by 5B, for each data field, a getter method is called to obtain a data field value. If the data field value is not null, then a modified data field value has been identified. As indicated by 5C, a setter method is called on a corresponding data field of the existing data object. The modified updater data field value is passed to the setter method.

As indicated by 6, a next data field update is processed or the process 400 terminates. As can be seen in FIG. 4, the process 400 can perform an update to an existing data object using defined getter and setter methods, data class reflection, and a dummy updater object. In this way, no additional code is needed to process individual data fields. In addition, modifying the data class hierarchy and, in particular, the data structure (e.g., adding or removing data class and/or data fields) does not require modification of the update code, since getter and setter methods are already defined when coding new data class objects. Also, data class reflection is used to automatically traverse all the data fields in the data class hierarchy, which eliminates the need to design, develop, test, support, and/or maintain separate blocks of code to implement all possible data field updates.

It should be noted that the process 400 is not limited to the above-described order of 1-6. Furthermore, one or more of 1-6 may be combined. For example, step 2 and 4 may be combined into a single process in which the existing class object is obtained and the object class type is returned.

Figure 5:
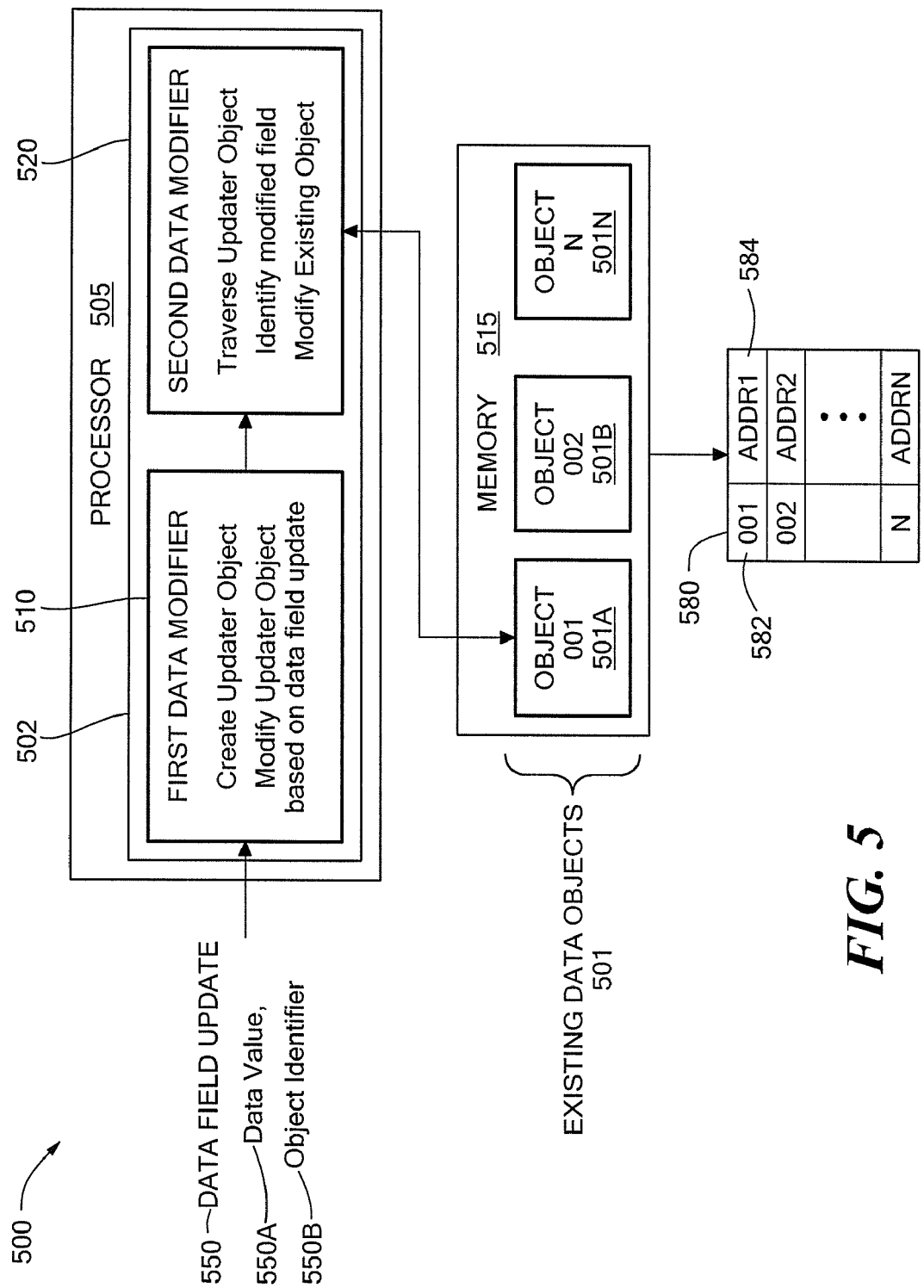
FIG. 5 is a block diagram of a system for updating data.

Referring now to FIG. 5, in another aspect, a system 500 for updating data includes a data class updater 502 executing in processor 505 for receiving a data field update 550 associated with an existing data object (generally denoted by reference numeral 501) of a data class. The data class updater 502 includes a first data modifier 510 to modify a data field of an updater data object of the data class based upon the data field update 550, and a second data modifier 520 to traverse the updater data object, identify the modified data field, and modify a data field of the existing data object based on the identified data field. The existing data object (i.e., 501A, 501B, and/or 501N) is received from a memory 515.

In a further embodiment, existing data objects 501 are retrieved from a memory 550 using a hash table 580 including an object key entry 582 to denote a unique object key (e.g., "001", "002", etc.) for an existing data object 501, and a memory address 584 (e.g., "ADDR1", "ADDR2", etc.), which identifies and/or references a memory location at which an existing data object 501 is stored in memory 515. As is known in the art, the memory address may refer to byte-addressable storage in memory 515 including, but not limited to, addressable storage in a memory cache, a random-access memory, a read-only memory, and a hard drive storage device.

Figure 6:
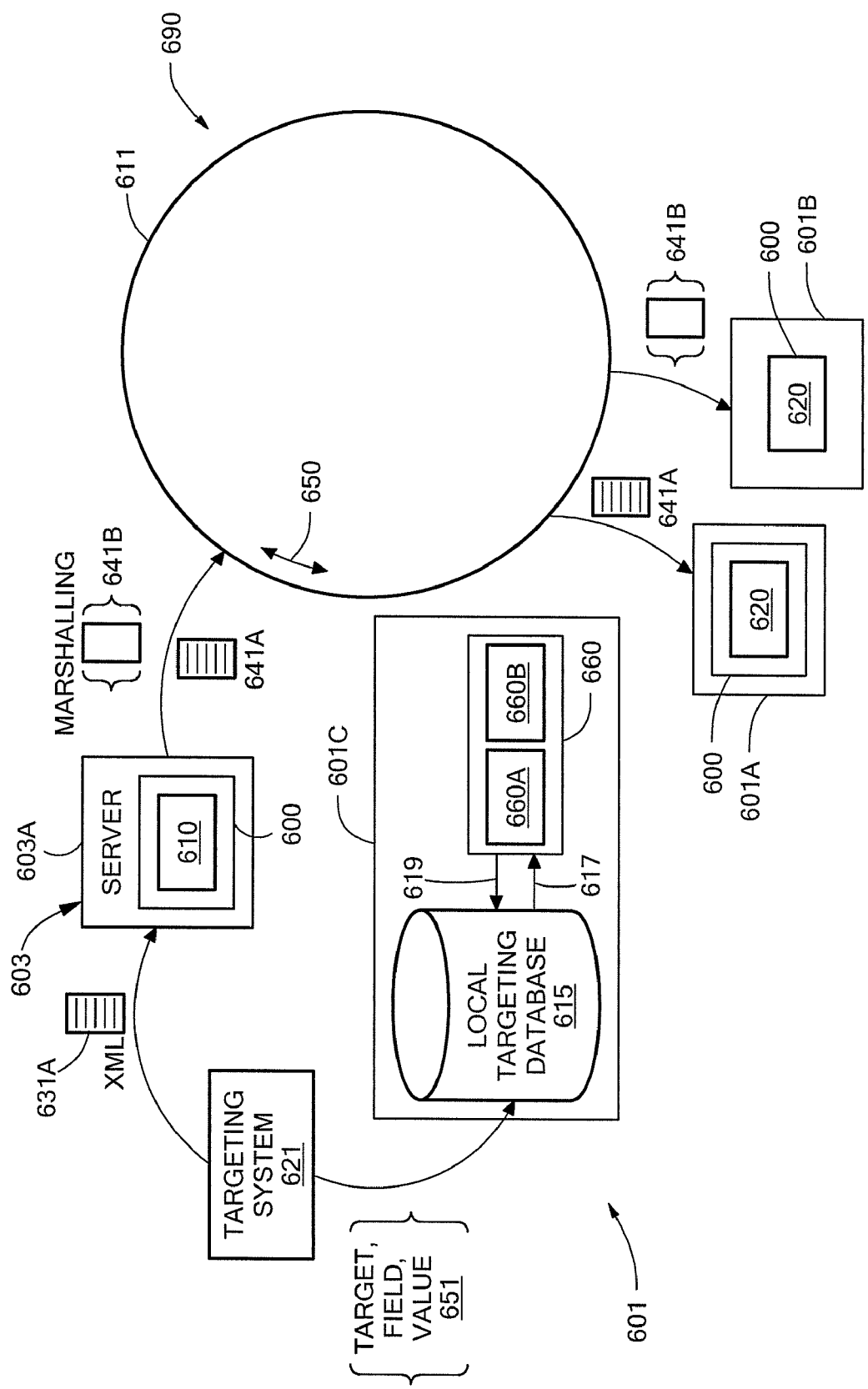
FIG. 6 is a block diagram of a networked environment incorporating the inventive concepts and systems for updating data class objects.

Referring now to FIG. 6, a networked environment 690 incorporating the inventive concepts and systems for updating data class objects includes clients 601, servers 603, and external systems 621 for sending data field updates 650 over a network 611. In an exemplary operation of the networked environment 690, an external system 621, such as a targeting system, processes an update to a targeting object. The targeting system 621 sends the updated targeting object (including an updated value) to a first server 603A as an XML file 631A.

In one embodiment, the data object updater 600 includes a first data modifier 610 executing as a server component, and a second data modifier 620 executing as a client component. The first data modifier 610 executing on the first server 603A receives the updated targeting object and generates new targeting object that includes a data field update based on the updated value. The first server 603A sends the new object to a first client 601A as an XML file 641A, which receives and parses the XML file 641A and processes the data field update. The second data modifier 620 executing on the first client 601A, traverses the updater object, identifies the modified data field, and updates the data field of an existing data object.

In another exemplary operation of the networked environment 690, the first data modifier 610 sends the updater object to a second client 601B as marshalled data 641B. The second client 601B unmarshals the data 641B and processes the data field update. The second data modifier 620 traverses the updater object, identifies the modified data field, and updates the data field of an existing data object.

In still another exemplary operation of the networked environment 690, the targeting system 621 sends a data field update 651, which may include a target, a data field, and a data value, to a third client 601C. The third client 601C processes the data field update and passes the data update to a local targeting database 615. A data updater object 660 executing on the third client 601C receives the data field update 617 from the database 615. For example, the data updater object 660 may receive the data field update 617 in response to a query 619, such as a structured query language SQL command to the database 617.

The data object updater 660 includes a first data modifier 660A and a second data modifier 660B executing on the third client 601C. The first data modifier 660A creates an updater class object and sets a data field of the updater class object based on the data update value. The remaining fields may be set to the null value. The second data modifier 660B retrieves an existing class object associated with the data field update and traverses the data fields of the updater class object. If a non-null data field is identified, the second data modifier 660B sets the corresponding data field of the existing data object to the identified data field.

Figure 7:
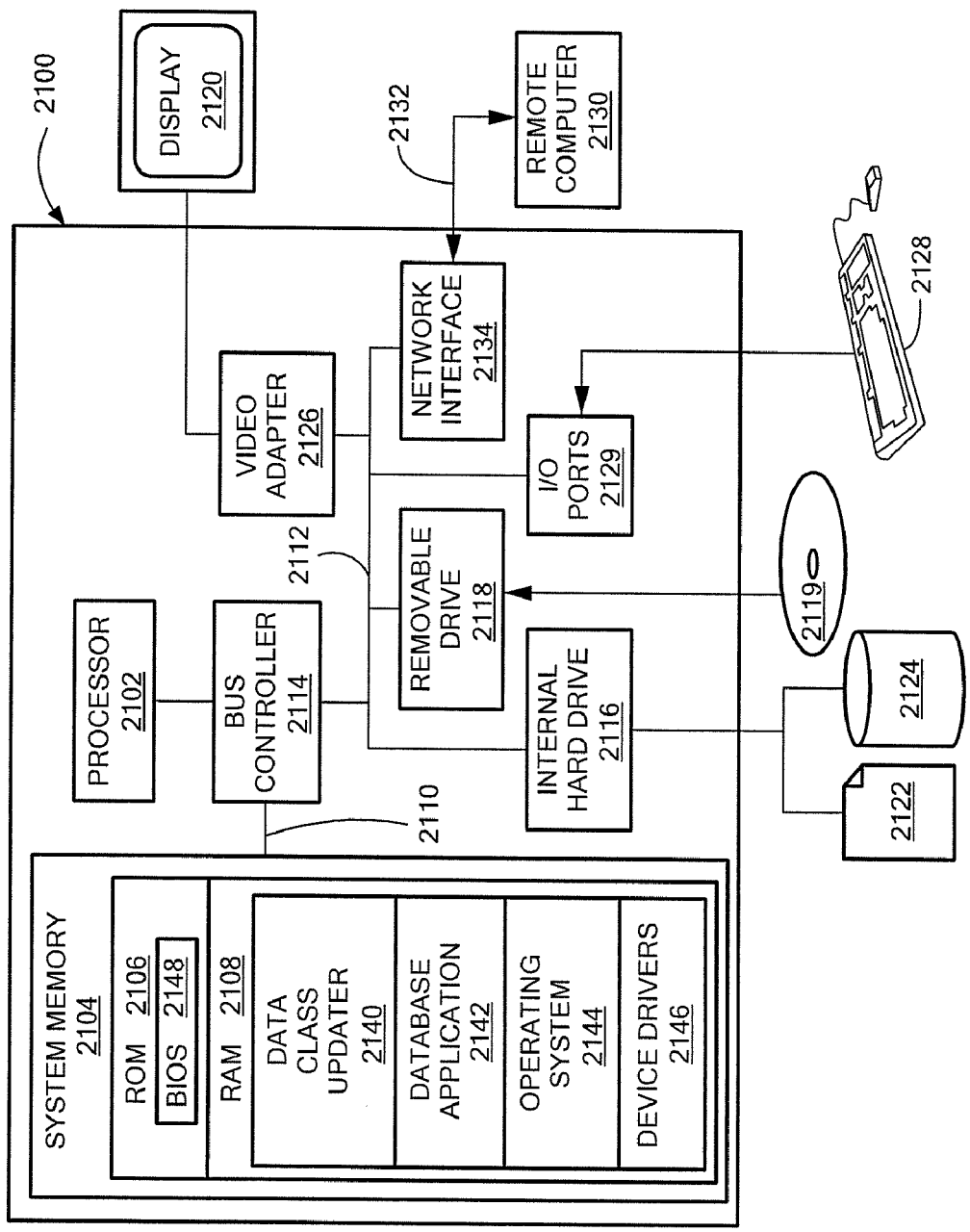
FIG. 7 is a diagram of an exemplary hardware and operating environment of a suitable computer for use with embodiments of the invention.

FIG. 7 illustrates a computer 2100 suitable for supporting the operation of an embodiment of the inventive concepts and systems described herein. The computer 2100 includes a processor 2102, for example, a dual-core processor, such as the AMD Athlon™ X2 Dual Core processor from the Advanced Micro Devices Corporation. However, it should be understood that the computer 2100 may use other microprocessors. Computer 2100 can represent any server, personal computer, laptop, or even a battery-powered mobile device such as a hand-held personal computer, personal digital assistant, or smart phone.

Computer 2100 includes a system memory 2104 which is connected to the processor 2102 by a system data/address bus 2110. System memory 2104 includes a read-only memory (ROM) 2106 and random access memory (RAM) 2108. The ROM 2106 represents any device that is primarily read-only including electrically erasable programmable read-only memory (EEPROM), flash memory, etc. RAM 2108 represents any random access memory such as Synchronous Dynamic Random Access Memory (SDRAM). The Basic Input/Output System (BIOS) 2148 for the computer 2100 is stored in ROM 2106 and loaded into RAM 2108 upon booting.

Within the computer 2100, input/output (I/O) bus 2112 is connected to the data/address bus 2110 via a bus controller 2114. In one embodiment, the I/O bus 2112 is implemented as a Peripheral Component Interconnect (PCI) bus. The bus controller 2114 examines all signals from the processor 2102 to route signals to the appropriate bus. Signals between processor 2102 and the system memory 2104 are passed through the bus controller 2114. However, signals from the processor 2102 intended for devices other than system memory 2104 are routed to the I/O bus 2112.

Various devices are connected to the I/O bus 2112 including internal hard drive 2116 and removable storage drive 2118 such as a CD-ROM drive used to read a compact disk 2119 or a floppy drive used to read a floppy disk. The internal hard drive 2116 is used to store data, such as in files 2122 and database 2124. Database 2124 includes a structured collection of data, such as a relational database. A display 2120, such as a cathode ray tube (CRT), liquid-crystal display (LCD), etc. is connected to the I/O bus 2112 via a video adapter 2126.

A user enters commands and information into the computer 2100 by using input devices 2128, such as a keyboard and a mouse, which are connected to I/O bus 2112 via I/O ports 2129. Other types of pointing devices that may be used include track balls, joy sticks, and tracking devices suitable for positioning a cursor on a display screen of the display 2120.

Computer 2100 may include a network interface 2134 to connect to a remote computer 2130, an intranet, or the Internet via network 2132. The network 2132 may be a local area network or any other suitable communications network.

Computer-readable modules and applications 2140 and other data are typically stored on memory storage devices, which may include the internal hard drive 2116 or the compact disk 2119, and are copied to the RAM 2108 from the memory storage devices. In one embodiment, computer-readable modules and applications 2140 are stored in ROM 2106 and copied to RAM 2108 for execution, or are directly executed from ROM 2106. In still another embodiment, the computer-readable modules and applications 2140 are stored on external storage devices, for example, a hard drive of an external server computer, and delivered electronically from the external storage devices via network 2132.

The computer-readable modules 2140 may include compiled instructions for implementing a data class updater similar to that described in conjunction with the figures. Information related to an updated existing data class object may be outputted to display 2120. For example, an update to a targeting object may be outputted to display 2120 to enable military personnel to control and/or monitor targeting systems.

Components of the data class updater may be implemented in one or more of the computer-readable modules. For example, a first data modifier and a second data modifier similar to those described in conjunction with FIG. 5 may be implemented in separate computer-readable modules.

In a further embodiment, the computer 2100 may execute a data class updater on separate processors to increase response time and for fault tolerance. For example, a first data modifier may be executed on a first processor and a second data modifier may be executed on a second processor. The first and second processor may be respective processors of a dual-core processor.

Alternatively, the first and second processor may be respective first and second computing devices. In a further embodiment, the first data modifier is executed on a server machine and the second data modifier is executed on a client machine. For example, the first data modifier may send a data field update as a serialized data object over a network to the second data modifier.

The computer 2100 may execute a database application 2142, such as Oracle™ database from Oracle Corporation, to model, organize, and query data stored in database 2124. The data may be used by the computer-readable modules and applications 2140 and/or passed over the network 2132 to the remote computer 2130 and other systems.

In general, the operating system 2144 executes computer-readable modules and applications 2140 and carries out instructions issued by the user. For example, when the user wants to execute a computer-readable module 2140, the operating system 2144 interprets the instruction and causes the processor 2102 to load the computer-readable module 2140 into RAM 2108 from memory storage devices. Once the computer-readable module 2140 is loaded into RAM 2108, the processor 2102 can use the computer-readable module 2140 to carry out various instructions. The processor 2102 may also load portions of computer-readable modules and applications 2140 into RAM 2108 as needed. The operating system 2144 uses device drivers 2146 to interface with various devices, including memory storage devices, such as hard drive 2116 and removable storage drive 2118, network interface 2134, I/O ports 2129, video adapter 2126, and printers.

Having described preferred embodiments of the invention it will now become apparent to those of ordinary skill in the art that other embodiments incorporating these concepts may be used. Accordingly, it is submitted that the invention should not be limited to the described embodiments but rather should be limited only by the spirit and scope of the appended claims.

What is claimed:

1. A method for updating data, comprising:
in a processor, receiving a data field update associated with an existing data object of a data class;
modifying a data field of an updater data object of the data class based upon the data field update;
traversing the updater data object to identify the modified data field; and
modifying a data field of the existing data object based upon the identified data field of the updater data object.

2. The method of claim 1, wherein the data field update includes a data object key, further comprising using the data object key to retrieve the existing data object from a memory.

3. The method of claim 1, wherein modifying the data field of the updater data object of the data class based upon the data field update comprises calling an update function of the updater data object associated with the data field.

4. The method of claim 1, wherein the updater data object includes a java class and the data field of the updater data object is a primitive of the java class.

5. The method of claim 1, further comprising mapping the updater data object, wherein traversing the updater data object comprises traversing the mapped updater data object.

6. The method of claim 1, wherein the existing data object is created upon receiving the data field update.

7. The method of claim 1, wherein the data field update includes an update value, further comprising setting at least one other data field of the updater data object to a predetermined value different than the update value.

8. The method of claim 7, wherein the predetermined value is null.

9. The method of claim 1, wherein the data class is a java bean having a data class hierarchy and traversing the updater data object to identify the modified data field comprises using java reflection to traverse the data class hierarchy of the updater data object to identify the modified data field.

10. The method of claim 9, wherein the modified data field is identified based on a predetermined value of at least one other data field of the updater data object.

11. The method of claim 1, wherein the processor is a first processor of a server machine, further comprising receiving the updater data object in a second processor of a client machine.

12. The method of claim 11, wherein the updater data object includes at least one other data field equal to a predetermined value different than the value of the modified data field.

13. The method of claim 12, wherein the predetermined value equals null.

14. The method of claim 13, wherein the second processor receives an extensible markup language (XML) encoded version of the updater data object.

15. The method of claim 13, wherein the second processor receives a marshaled version of the updater data object.

16. A system for updating data, comprising:
instructions stored in a memory that when executed by a processor result in the following:
a data class updater for receiving a data field update associated with an existing data object of a data class, comprising:
a first data modifier to modify a data field of an updater data object of the data class based upon the data field update; and
a second data modifier to traverse the updater data object, identify the modified data field, and modify a data field of the existing data object based upon the identified data field.

17. The system of claim 16, wherein the data field update includes a data object key and the data class updater uses the data object key to retrieve the existing data object.

18. The system of claim 16, wherein the first data modifier modifies the data field of the updater data object of the data class by calling an update function of the updater data object associated with the data field.

19. The system of claim 16, wherein the updater data object includes a java class and the data field of the updater data object is a primitive of the java class.

20. The system of claim 16, the second data modifier maps the updater data object and traverses the mapped updater data object.

21. The system of claim 16, wherein the second data modifier creates the existing data object upon receiving the data field update.

22. The system of claim 16, wherein the data field update includes an update value and the first data modifier sets at least one other data field of the updater data object to a predetermined value different than the update value.

23. The system of claim 22, wherein the predetermined value is null.

24. The system of claim 16, wherein the data class is a java bean having a data class hierarchy and the second data modifier uses java reflection to traverse the data class hierarchy of the updater data object to identify the modified data field.

25. The system of claim 24, wherein the modified data field is identified based on a predetermined value of at least one other data field of the updater data object.

26. The system of claim 16, wherein the first data modifier executes on a first processor, the second data modifier executes on a second processor, and the second data modifier receives the updater data object over a network.

27. A computer-readable medium having encoded thereon software for updating data, said software comprising instructions for:
   receiving a data field update associated with an existing data object of a data class;
   modifying a data field of an updater data object of the data class based upon the data field update;
   traversing the updater data object to identify the modified data field; and
   modifying a data field of the existing data object based upon the identified data field of the updater data object.

28. The computer-readable medium of claim 27, wherein the data field update includes a data object key, further comprising using the data object key to retrieve the existing data object from a memory.

29. The computer-readable medium of claim 27, wherein modifying the data field of the updater data object of the data class comprises calling an update function of the updater data object associated with the data field.

30. The computer-readable medium of claim 27, wherein the updater data object includes a java class and the data field of the updater data object is a primitive of the java class.

31. The computer-readable medium of claim 27, said software further comprising instructions for mapping the updater data object, wherein traversing the updater data object comprises traversing the mapped updater data object.

32. The computer-readable medium of claim 27, wherein the existing data object is created upon receiving the data field update.

33. The computer-readable medium of claim 27, wherein the data field update includes an update value, said software further comprising instructions for setting at least one other data field of the updater data object to a predetermined value different than the update value.

34. The computer-readable medium of claim 33, wherein the predetermined value is null.

35. The computer-readable medium of claim 27, wherein the data class is a java bean having a data class hierarchy and traversing the updater data object to identify the modified data field comprises using java reflection to traverse the data class hierarchy of the updater data object to identify the modified data field.

36. The computer-readable medium of claim 35, wherein the modified data field is identified based on a predetermined value of at least one other data field of the updater data object.

* * * * *